US012654500B2

(12) United States Patent
Collins

(10) Patent No.: US 12,654,500 B2
(45) Date of Patent: Jun. 16, 2026

(54) HITCH ASSEMBLY INCLUDING A STABILIZER FOR A TRAILER DOLLY

(71) Applicant: Anthony Collins, South Elgin, IL (US)

(72) Inventor: Anthony Collins, South Elgin, IL (US)

( * ) Notice: Subject to any disclaimer, the term of this patent is extended or adjusted under 35 U.S.C. 154(b) by 701 days.

(21) Appl. No.: 18/104,865

(22) Filed: Feb. 2, 2023

(65) Prior Publication Data

US 2024/0262141 A1 Aug. 8, 2024

(51) Int. Cl.
*B60D 1/34* (2006.01)
*B62D 53/08* (2006.01)

(52) U.S. Cl.
CPC ......... *B60D 1/345* (2013.01); *B62D 53/0864* (2013.01)

(58) Field of Classification Search
CPC ............................ B62D 53/0864; B60D 1/363
See application file for complete search history.

(56) References Cited

U.S. PATENT DOCUMENTS

| | | | | |
|---|---|---|---|---|
| 3,612,575 A | * | 10/1971 | Stewart ................... | B62D 13/06 |
| | | | | 280/474 |
| 3,663,039 A | * | 5/1972 | Morgan ................. | B62D 13/06 |
| | | | | 280/455.1 |
| 3,801,137 A | * | 4/1974 | Zucca .................... | B62D 13/06 |
| | | | | 280/448 |
| 3,815,939 A | * | 6/1974 | Pettay ................ | B62D 53/0864 |
| | | | | 280/476.1 |
| 4,603,876 A | * | 8/1986 | Gray ...................... | B60D 1/167 |
| | | | | 280/476.1 |
| 5,236,215 A | | 8/1993 | Wylie | |
| 6,796,573 B2 | | 9/2004 | Beaudoin | |
| 7,690,670 B1 | | 4/2010 | Lincul | |
| 7,946,606 B2 | * | 5/2011 | Roush .................... | B60D 1/245 |
| | | | | 280/476.1 |
| 7,976,051 B1 | * | 7/2011 | Laster .................... | B60D 1/665 |
| | | | | 280/491.2 |
| 8,919,804 B2 | | 12/2014 | Svihla | |
| 9,511,637 B1 | | 12/2016 | Frey | |
| 10,632,802 B1 | | 4/2020 | Bertalon | |
| 2007/0007748 A1 | | 1/2007 | Hancock | |

FOREIGN PATENT DOCUMENTS

WO WO2006108303 10/2006

* cited by examiner

*Primary Examiner* — Minnah L Seoh
*Assistant Examiner* — Hosam Shabara

(57) ABSTRACT

A hitch assembly for attaching a following trailer to a leading trailer and preventing lateral pivoting of the hitch assembly with respect to the leading trailer includes a dolly which laterally pivotally attaches to a hitch of the leading trailer. The dolly trails the leading trailer and has a fifth wheel hitch for attaching to a following trailer. A stabilizer on the dolly is deployable near a rear end of the leading trailer such that lateral pivoting of the dolly with respect to the leading trailer is limited or entirely obstructed. The inhibiting action of the stabilizer facilitates accurate alignment of the fifth wheel hitch with the following trailer.

8 Claims, 5 Drawing Sheets

1

HITCH ASSEMBLY INCLUDING A STABILIZER FOR A TRAILER DOLLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trailer dollies and more particularly pertains to a new trailer dolly for attaching a following trailer to a leading trailer and preventing lateral pivoting of the trailer dolly with respect to the leading trailer.

(2) Description of Related Art Including Information Disclosed Under 37 CFR 1.97 and 1.98

The prior art relates to trailer dollies which attach to a hitch of a leading trailer and provide a fifth wheel hitch for attaching to a following trailer. These devices do not provide a means of stabilization so that the trailer dolly is prevented from pivoting laterally with respect to the leading trailer when the leading trailer and the trailer dolly are moved toward a following trailer.

BRIEF SUMMARY OF THE INVENTION

An embodiment of the disclosure meets the needs presented above by generally comprising a dolly with a frame, an axle, and a plurality of wheels. "Dolly" as used in the specification and the claims refers to an unpowered vehicle designed to connect a first trailer to the back of a truck or a second trailer. Dollies may be referred to as converter dollies. The axle is rotatably coupled to the frame, and each wheel of the plurality of wheels is mounted on the axle. The dolly has a hitch coupler configured for laterally pivotally coupling to a hitch of the leading trailer extending forwardly with respect to the frame. The dolly has a fifth wheel hitch mounted on a top side of the frame for coupling to the following trailer. A stabilizer is coupled to the top side of the frame for selectively obstructing lateral pivoting of the dolly with respect to the leading trailer. The stabilizer comprises a mounting bracket that is coupled to the frame and an alignment member that is pivotally coupled to the mounting bracket. The alignment member is movable between a stored position and a deployed position. The stored position comprises the alignment member extending rearwardly with respect to the dolly, and the deployed position comprising the alignment member extending forwardly with respect to the dolly. The alignment member is configured for is positioned adjacent to a rear end of the leading trailer when is positioned in the deployed position such that lateral pivoting of the hitch assembly with respect to the leading trailer is limited.

Another embodiment of the disclosure comprises a method of attaching a following trailer to a leading trailer via a hitch assembly. The method comprises attaching a hitch coupler of the hitch assembly to a hitch of a leading trailer such that the hitch assembly is laterally pivotable with respect to the leading trailer and positioning an alignment member of the hitch assembly in a deployed position wherein the alignment member is positioned adjacent to a rear end of the leading trailer such that lateral pivoting of the hitch assembly with respect to the leading trailer is limited. The leading trailer and the hitch assembly are moved toward the following trailer until a trailer coupler of the following trailer engages a fifth wheel hitch of the hitch assembly, and the alignment member is positioned in a stored position in which each engagement surface of the pair of engagement surfaces is disengaged from the rear end of the leading trailer.

The step of positioning the alignment member in the deployed position may further comprise positioning a pair of engagement surfaces of the hitch assembly adjacent to the rear end of the leading trailer to limit lateral pivoting of the hitch assembly with respect to the leading trailer. The pair of engagement surfaces in this case are laterally opposed from each other across the hitch coupler. The pair of engagement surfaces may also be positioned in abutment with the rear end of the leading trailer when positioning the alignment member in the deployed position such that lateral pivoting of the hitch assembly with respect to the leading trailer is entirely obstructed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
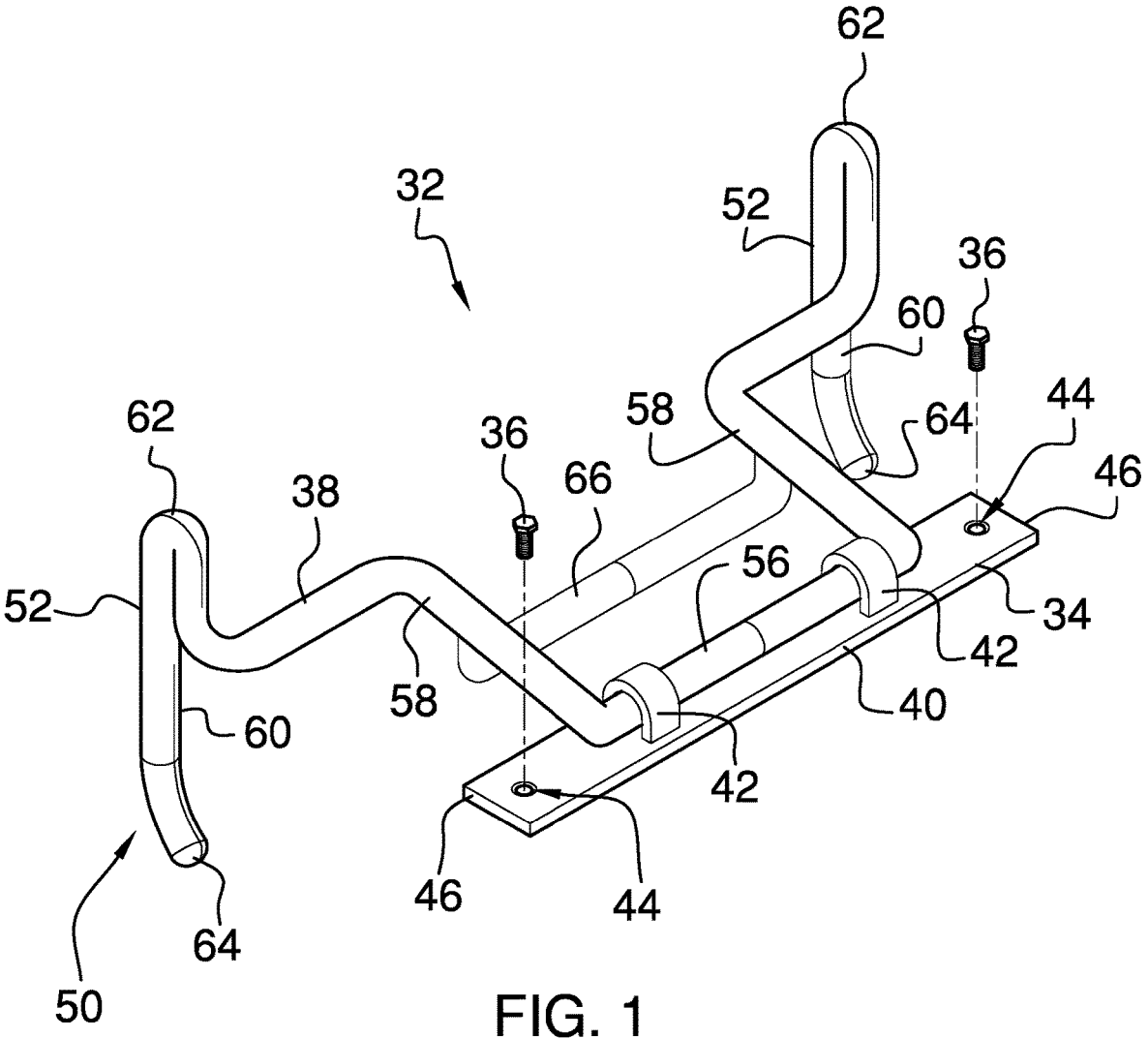
FIG. 1 is a top rear side perspective view of a stabilizer according to an embodiment of the disclosure.
Figure 2:
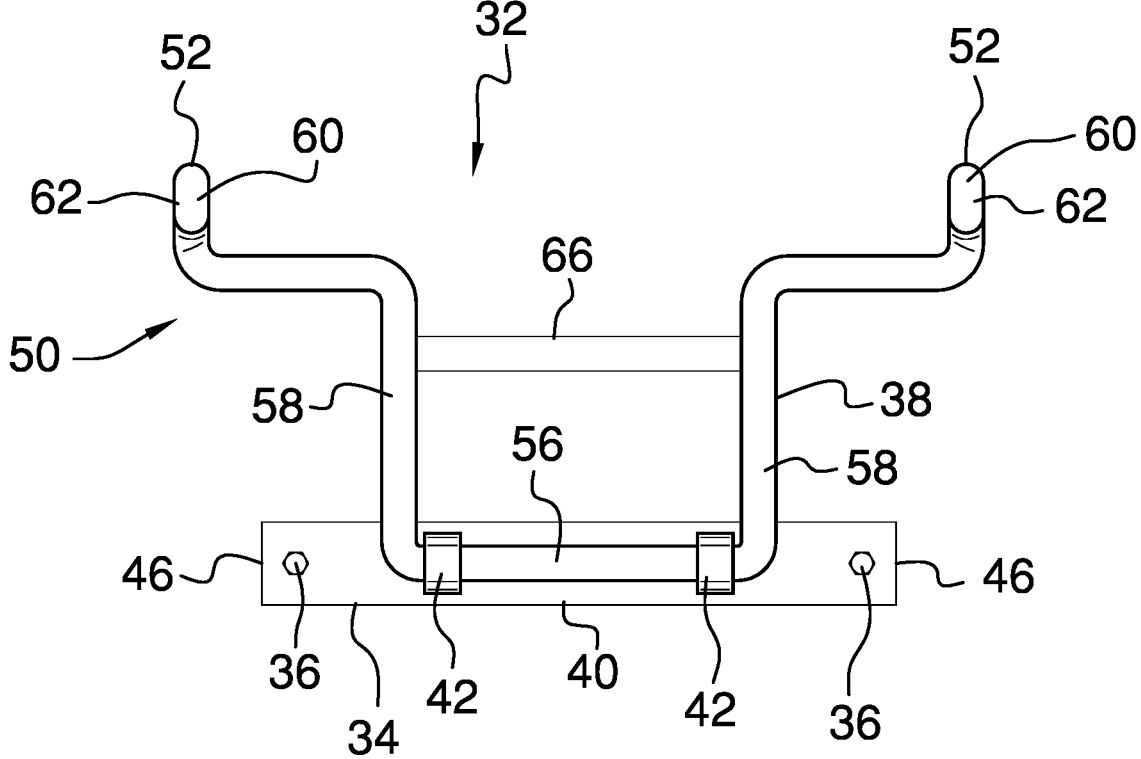
FIG. 2 is a top view of a stabilizer according to an embodiment of the disclosure.
Figure 3:
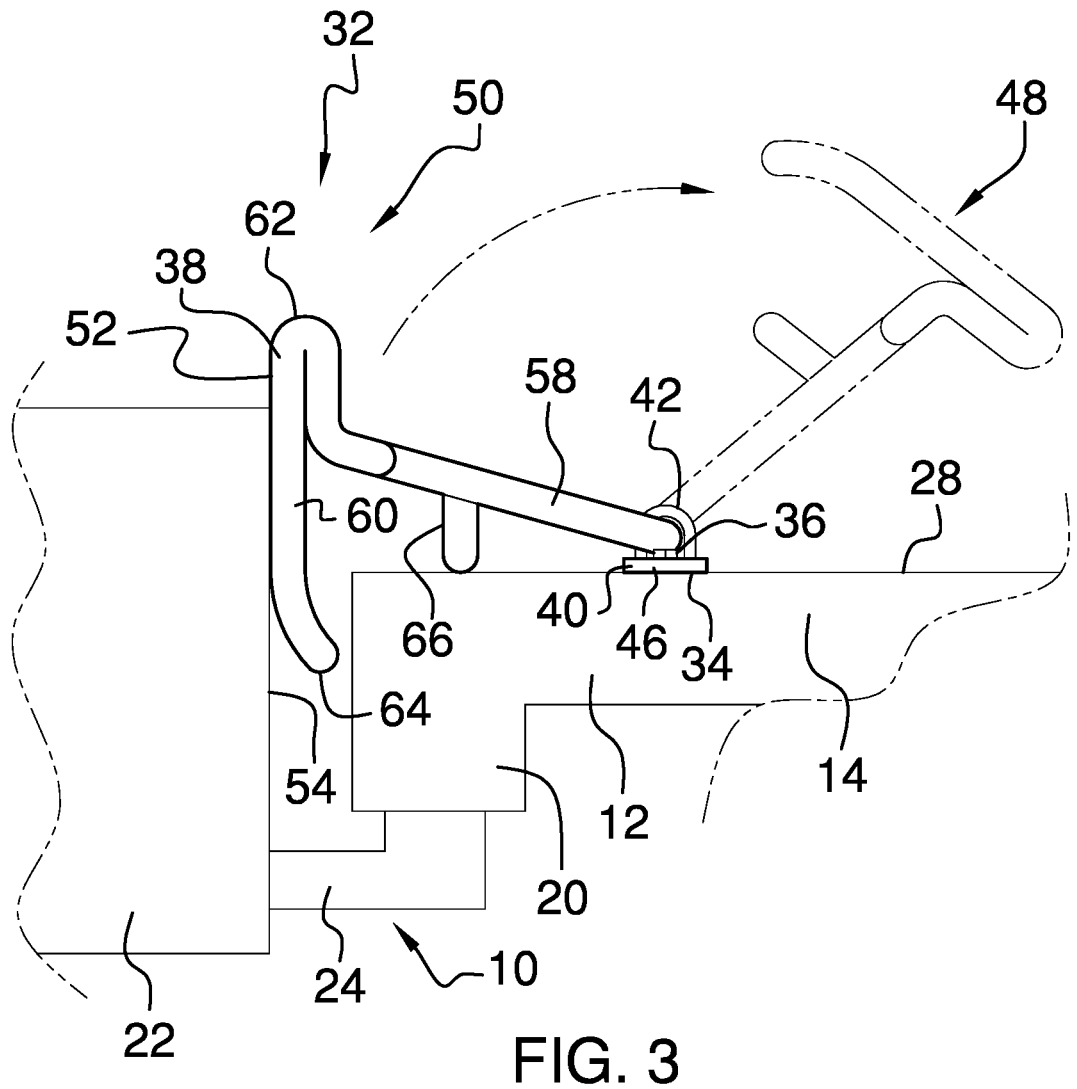
FIG. 3 is a side in-use view of a hitch assembly according to an embodiment of the disclosure.
Figure 4:
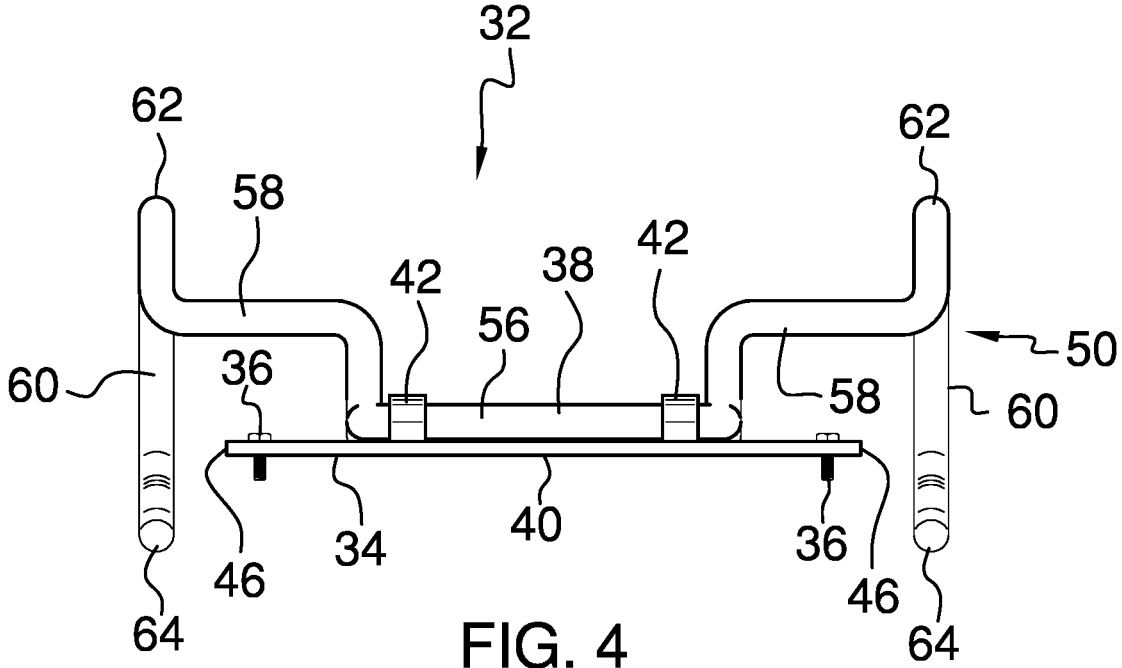
FIG. 4 is a rear view of a stabilizer according to an embodiment of the disclosure.
Figure 5:
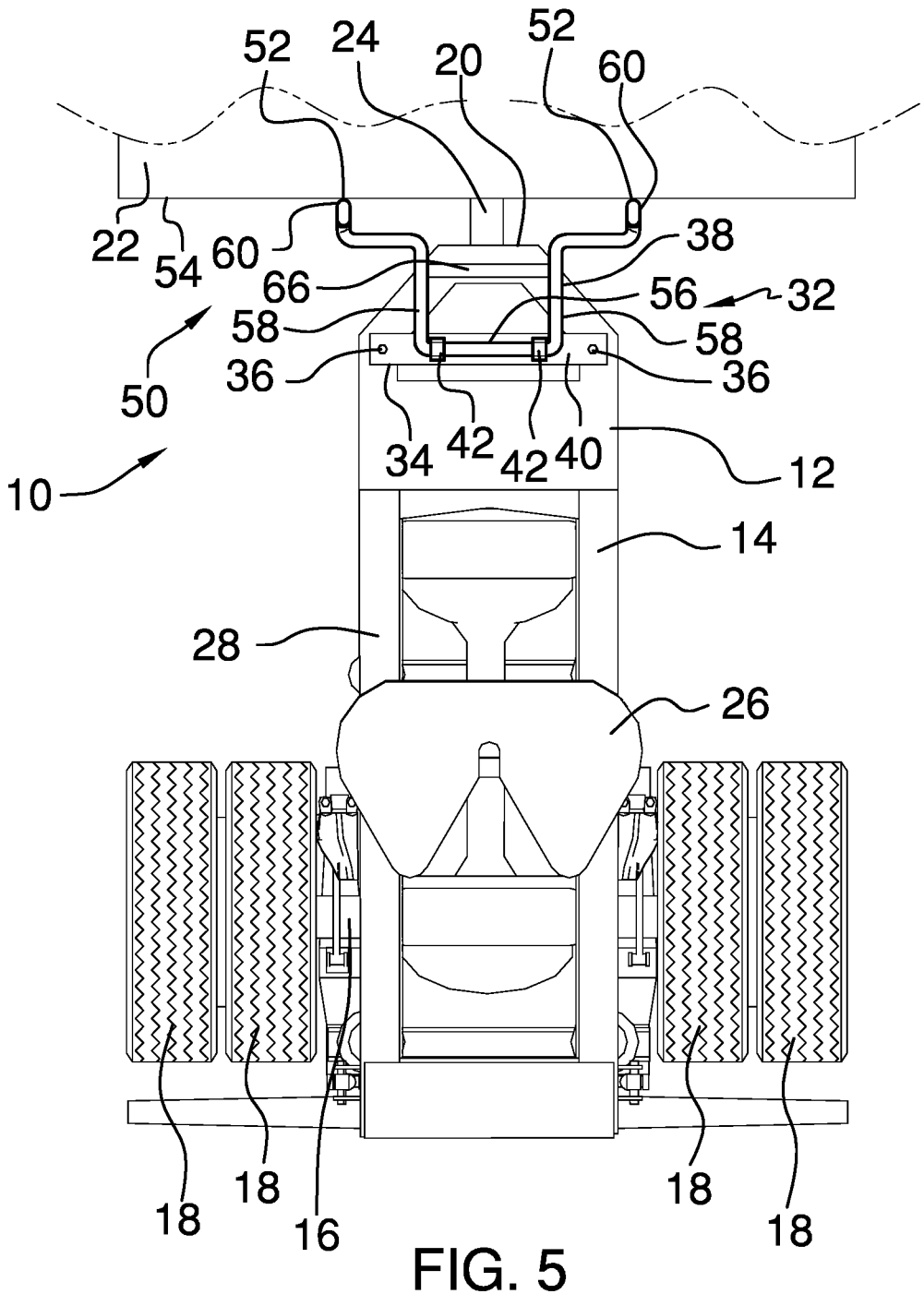
FIG. 5 is a top in-use view of a hitch assembly according to an embodiment of the disclosure.

With reference now to the drawings, and in particular to FIGS. 1 through 5 thereof, a new trailer dolly embodying the principles and concepts of an embodiment of the disclosure and generally designated by the reference numeral 10 will be described.

As best illustrated in FIGS. 1 through 5, the hitch assembly 10 generally comprises a dolly 12 with a frame 14, an axle 16, and a plurality of wheels 18. "Dolly" as used in the specification and the claims refers to an unpowered vehicle designed to connect a first trailer to the back of a truck or a second trailer. Dollies may be referred to as converter dollies. The axle 16 is rotatably coupled to the frame 14, and each wheel 18 of the plurality of wheels 18 is mounted on the axle 16. The dolly 12 has a hitch coupler 20 extending forwardly with respect to the frame 14 which is configured for laterally pivotally coupling to a hitch 24 of the leading trailer 22. The dolly 12 has a fifth wheel hitch 26 mounted on a top side 28 of the frame 14 for coupling to the following trailer.

A stabilizer 32 is coupled to the top side 28 of the frame 14 for selectively obstructing lateral pivoting of the dolly 12 with respect to the leading trailer 22. The stabilizer 32 comprises a mounting bracket 34, a pair of threaded fasteners 36, and an alignment member 38. The mounting bracket 34 is coupled to the frame 14. The mounting bracket 34 has a base 40 and a pair of radial bearings 42. Each radial bearing 42 of the pair of radial bearings 42 is laterally spaced from each other with respect to the base 40, and the pair of radial bearings 42 has a common central axis. A pair of holes 44 extend vertically through the base 40, and one of the pair of holes 44 is positioned adjacent to a respective lateral side 46 of a pair of lateral sides 46 of the base 40. Each threaded fastener 36 of a pair of threaded fasteners 36 extends through a respective hole 44 of the pair of holes 44 and the frame 14 to couple the mounting bracket 34 to the frame 14.

The alignment member 38 is pivotally coupled to the mounting bracket 34 and is movable between a stored position 48 and a deployed position 50. The stored position 48 comprises the alignment member 38 extending rearwardly with respect to the dolly 12, and the deployed position 50 comprises the alignment member 38 extending forwardly with respect to the dolly 12. The alignment member 38 has a pair of engagement surfaces 52 which are laterally opposed from each other across the hitch coupler 20 of the dolly 12. Each engagement surface 52 of the pair of engagement surfaces 52 faces forwardly with respect to the dolly 12 when the alignment member 38 is positioned in the deployed position 50 adjacent to a rear end 54 of the leading trailer 22 such that lateral pivoting of the hitch assembly 10 with respect to the leading trailer 22 is limited. Each engagement surface 52 may be positioned in abutment with the rear end 54 when the alignment member 38 is positioned in the deployed position 50 such that lateral pivoting of the hitch assembly 10 with respect to the leading trailer 22 is entirely obstructed.

The alignment member 38 comprises a shaft 56, a pair of extension arms 58, and a pair of engagement bars 60. The shaft 56 extends through each radial bearing 42 of the pair of radial bearings 42. The shaft 56 is coupled to and extends between each extension arm 58 of the pair of extension arms 58. Each extension arm 58 of the pair of extension arms 58 extends laterally away and radially away from the shaft 56. Each engagement bar 60 of the pair of engagement bars 60 is coupled to a distal end 62 of a respective extension arm 58 of the pair of extension arms 58 relative to the shaft 56. Each engagement surface 52 of the pair of engagement surfaces 52 is positioned on a respective engagement bar 60 of the pair of engagement bars 60. Each engagement bar 60 of the pair of engagement bars 60 extends downwardly from the respective extension arm 58 when the alignment member 38 is positioned in the deployed position 50. A free end 64 of each engagement bar 60 of the pair of engagement bars 60 curves radially inwardly with respect to the shaft 56.

A support bar 66 is coupled to the alignment member 38 and engages the frame 14 to position the alignment member 38 in the deployed position 50 when the alignment member 38 is moved to extend forwardly from the mounting bracket 34. The support bar 66 extends downwardly from the alignment member 38 to the top side 28 of the frame 14 when the alignment member 38 is positioned in the deployed position 50. The alignment member 38 is coupled to and extends between each extension arm 58 of the pair of extension arms 58.

In use, the alignment member 38 of the stabilizer 32 is positioned in the deployment position to limit lateral pivoting of the hitch assembly 10 with respect to the leading trailer 22. Then the leading trailer 22 and the hitch assembly 10 are moved toward the following trailer so that the following trailer attaches to the fifth wheel hitch 26 of the dolly 12. The leading trailer 22 and the hitch assembly 10 may be moved, for example, by a motor vehicle coupled to a front end of the leading trailer 22. The stabilizer 32 inhibits lateral pivoting of the hitch assembly 10 with respect to the leading trailer 22 while the leading trailer 22 and the hitch assembly 10 are moved. This inhibiting action facilitates accurate alignment of the fifth wheel hitch 26 with the following trailer.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hitch assembly for attaching a following trailer to a leading trailer, the hitch assembly being selectively configurable for limiting lateral pivoting with respect to the leading trailer, the assembly comprising:

a dolly having a frame, an axle, and a plurality of wheels, said axle being rotatably coupled to said frame, each wheel of said plurality of wheels being mounted on said axle, said dolly having a hitch coupler configured for laterally pivotally coupling to a hitch of the leading trailer extending forwardly with respect to said frame, said dolly having a fifth wheel hitch mounted on a top side of said frame for coupling to the following trailer;

a stabilizer being coupled to said top side of said frame for selectively obstructing lateral pivoting of said dolly with respect to the leading trailer, said stabilizer comprising:

a mounting bracket being coupled to said frame; and an alignment member being pivotally coupled to said mounting bracket, said alignment member being movable between a stored position and a deployed position, said stored position comprising said alignment member extending rearwardly with respect to said dolly, said deployed position comprising said alignment member extending forwardly with respect to said dolly, said alignment member being configured for being positioned adjacent to a rear end of the leading trailer when being positioned in the deployed position such that lateral pivoting of the hitch assembly with respect to the leading trailer is limited; and a support bar being coupled to said alignment member, said support bar engaging said frame to position said alignment member in said deployed position when said alignment member is moved to extend forwardly from said mounting bracket, said support bar extending downwardly from said alignment member to said top side of said frame when said alignment member is positioned in said deployed position.

2. The assembly of claim 1, wherein said alignment member has a pair of engagement surfaces, said pair of engagement surfaces being laterally opposed from each other across said hitch coupler of said dolly, each engagement surface of said pair of engagement surfaces facing forwardly with respect to said dolly when said alignment member is positioned in said deployed position, each engagement surface of said pair of engagement surfaces being configured to abut a rear end of said leading trailer such that lateral pivoting of said hitch assembly with respect to the leading trailer is entirely obstructed.

3. A hitch assembly for attaching a following trailer to a leading trailer, the hitch assembly being selectively configurable for limiting lateral pivoting with respect to the leading trailer, the assembly comprising:

a dolly having a frame, an axle, and a plurality of wheels, said axle being rotatably coupled to said frame, each wheel of said plurality of wheels being mounted on said axle, said dolly having a hitch coupler configured for laterally pivotally coupling to a hitch of the leading trailer extending forwardly with respect to said frame, said dolly having a fifth wheel hitch mounted on a top side of said frame for coupling to the following trailer;

a stabilizer being coupled to said top side of said frame for selectively obstructing lateral pivoting of said dolly with respect to the leading trailer, said stabilizer comprising:

a mounting bracket being coupled to said frame; and an alignment member being pivotally coupled to said mounting bracket, said alignment member being movable between a stored position and a deployed position, said stored position comprising said alignment member extending rearwardly with respect to said dolly, said deployed position comprising said alignment member extending forwardly with respect to said dolly, said alignment member being configured for being positioned adjacent to a rear end of the leading trailer when being positioned in the deployed position such that lateral pivoting of the hitch assembly with respect to the leading trailer is limited; and wherein said mounting bracket has a base and a pair of radial bearings, each radial bearing of said pair of radial bearings being laterally spaced from each other with respect to said base, said pair of radial bearings having a common central axis, said alignment member comprising a shaft extending through each radial bearing of said pair of radial bearings.

4. The assembly of claim 3, wherein said alignment member comprises:

a pair of extension arms, each extension arm being coupled to said shaft, said shaft extending between each extension arm of said pair of extension arms, each extension arm of said pair of extension arms extending laterally away and radially away from said shaft; and a pair of engagement bars, each engagement bar being coupled to a distal end of a respective extension arm of said pair of extension arms relative to said shaft, said alignment member having a pair of engagement surfaces, each engagement surface of said pair of engagement surfaces being positioned on a respective engagement bar of said pair of engagement bars, said pair of engagement surfaces being laterally opposed from each other across said hitch coupler of said dolly, each engagement surface of said pair of engagement surfaces facing forwardly with respect to said dolly when said alignment member is positioned in said deployed position, each engagement surface of said pair of engagement surfaces being configured to abut a rear end of said leading trailer such that lateral pivoting of said hitch assembly with respect to the leading trailer is entirely obstructed.

5. The assembly of claim 4, further comprising a support bar being coupled to said alignment member, said support bar engaging said frame to position said alignment member in said deployed position when said alignment member is moved to extend forwardly from said mounting bracket, said support bar extending downwardly from said alignment member to said top side of said frame when said alignment member is positioned in said deployed position, said alignment member being coupled to and extending between each extension arm of said pair of extension arms.

6. The assembly of claim 3, wherein each engagement bar of said pair of engagement bars extends downwardly from said respective extension arm when said alignment member is positioned in said deployed position, a free end of each engagement bar of said pair of engagement bars curving radially inwardly with respect to said shaft.

7. The assembly of claim 3, wherein said base has a pair of holes extending vertically through said base, each hole of said pair of holes being positioned adjacent to a respective lateral side of a pair of lateral sides of said base, said hitch assembly further comprising a pair of threaded fasteners, each threaded fastener of said pair of fasteners extending through a respective hole of said pair of holes and said frame to couple said mounting bracket to said frame.

8. A hitch assembly for attaching a following trailer to a leading trailer, the hitch assembly being selectively laterally pivotable and selectively laterally fixed with respect to the leading trailer, the hitch assembly comprising:

a dolly having a frame, an axle, and a plurality of wheels, said axle being rotatably coupled to said frame, each wheel of said plurality of wheels being mounted on said axle, said dolly having a hitch coupler configured for laterally pivotally coupling to a hitch of the leading trailer extending forwardly with respect to said frame, said dolly having a fifth wheel hitch mounted on a top side of said frame for coupling to the following trailer; and a stabilizer being coupled to said top side of said frame for selectively obstructing lateral pivoting of said dolly with respect to the leading trailer, said stabilizer comprising:

a mounting bracket being coupled to said frame, said mounting bracket having a base and a pair of radial bearings, each radial bearing of said pair of radial bearings being laterally spaced from each other with respect to said base, said pair of radial bearings having a common central axis, said base having a pair of holes extending vertically through said base, each hole of said pair of holes being positioned adjacent to a respective lateral side of a pair of lateral sides of said base;

a pair of threaded fasteners, each threaded fastener of said pair of fasteners extending through a respective hole of said pair of holes and said frame to couple said mounting bracket to said frame;

an alignment member being pivotally coupled to said mounting bracket, said alignment member being movable between a stored position and a deployed position, said stored position comprising said alignment member extending rearwardly with respect to said dolly, said deployed position comprising said alignment member extending forwardly with respect to said dolly, said alignment member having a pair of engagement surfaces, said pair of engagement surfaces being laterally opposed from each other across said hitch coupler of said dolly, each engagement surface of said pair of engagement surfaces facing forwardly with respect to said dolly when said alignment member is positioned in said deployed position, each engagement surface of said pair of engagement surfaces being configured to abut a rear end of said leading trailer such that lateral pivoting of said hitch assembly with respect to the leading trailer is entirely obstructed, said alignment member comprising:

a shaft extending through each radial bearing of said pair of radial bearings;

a pair of extension arms, each extension arm being coupled to said shaft, said shaft extending between each extension arm of said pair of extension arms, each extension arm of said pair of extension arms extending laterally away and radially away from said shaft; and a pair of engagement bars, each engagement bar being coupled to a distal end of a respective extension arm of said pair of extension arms relative to said shaft, each engagement surface of said pair of engagement surfaces being positioned on a respective engagement bar of said pair of engagement bars, each engagement bar of said pair of engagement bars extending downwardly from said respective extension arm when said alignment member is positioned in said deployed position, a free end of each engagement bar of said pair of engagement bars curving radially inwardly with respect to said shaft; and a support bar being coupled to said alignment member, said support bar engaging said frame to position said alignment member in said deployed position when said alignment member is moved to extend forwardly from said mounting bracket, said support bar extending downwardly from said alignment member to said top side of said frame when said alignment member is positioned in said deployed position, said alignment member being coupled to and extending between each extension arm of said pair of extension arms.

* * * * *